Nov. 1, 1966 D. MITCHELL 3,283,249

BROADBAND RADIO REPEATER HAVING PARALLEL CHANNELS

Filed Dec. 23, 1963 2 Sheets-Sheet 1

INVENTOR
D. MITCHELL
BY [signature]
ATTORNEY

Nov. 1, 1966 D. MITCHELL 3,283,249

BROADBAND RADIO REPEATER HAVING PARALLEL CHANNELS

Filed Dec. 23, 1963 2 Sheets-Sheet 2

3,283,249
BROADBAND RADIO REPEATER HAVING PARALLEL CHANNELS

Doren Mitchell, Martinsville, N.J., assignor to Bell Telephone Laboratories, Incorporated, New York, N.Y., a corporation of New York Filed Dec. 23, 1963, Ser. No. 332,722
9 Claims. (Cl. 325—3)

Figure 1:
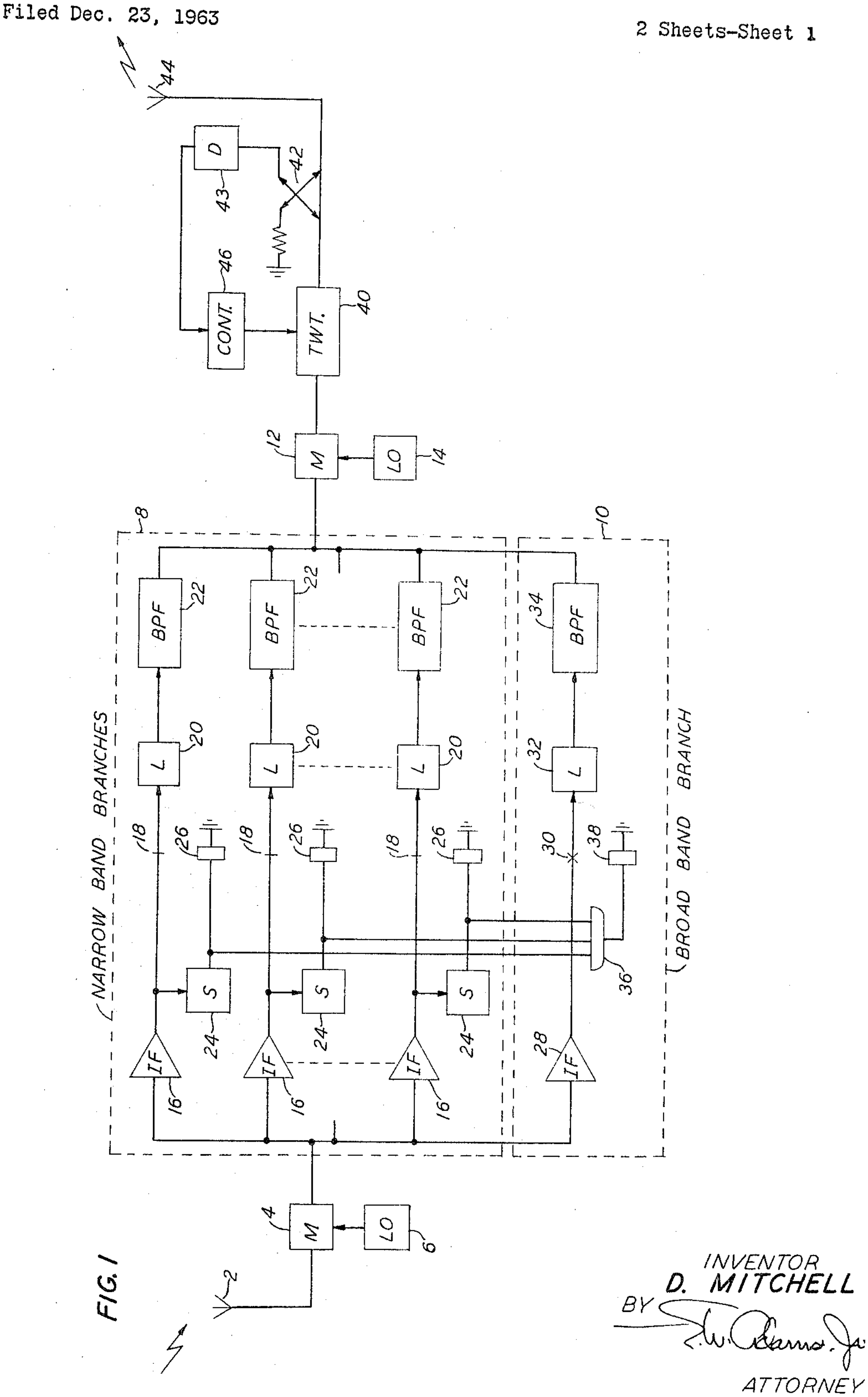

This invention relates to broadband radio relay systems, and more particularly, to repeaters employed in such systems.

Broadband radio repeaters are widely used at intervals in extended communication systems to amplify and relay the signals being transmitted between terminal points. To increase their versatility some of these repeaters are designed to accommodate, on an alternative basis as the traffic conditions of the system demand, either a plurality of narrowband signals, e.g., groups of multiplexed telephone signals, or a single broadband signal, e.g., a television signal, occupying the same frequency range. Further, the narrowband signals may be transmitted to the repeater from different sources, thus arriving at the repeater having different signal strength, and only some of the narrowband signals may be transmitted to the repeater during periods of light traffic. Such repeaters have broadband power amplifiers to boost the strength of the signal relayed by the repeater.

It is necessary to take special steps to maintain a constant composite signal strength at the output of the broadband power amplifier because the narrowband component signals arriving at the repeater vary in number and strength and may be individually subject to differing degrees of fading. A limiter or automatic gain control circuitry usually precedes the broadband power amplifier for this purpose. These steps create the possibility that the stronger narrowband signals may swamp the weaker ones. In the case where a limiter is used, this penomenon is attributable largely to intermodulation distortion. The limiter and the broadband power amplifier, to a lesser extent, introduce intermodulation distortion. The intermodulation components of the stronger narrowband signals may fall in the frequency range occupied by the weaker narrowband signals and may be of comparable size with the weaker narrowband signals, thus swamping them.

Therefore the object of this invention is to prevent swamping of weaker narrowband signals by stronger ones in a broadband radio repeater designed to accommodate alternatively either a plurality of narrowband signals or a single broadband signal that occupy the same frequency range.

In accordance with this object, a broadband radio repeater is provided with a plurality of branches connected in parallel, one branch accommodating each narrowband signal and one branch accommodating the broadband signal. Each branch has a bandpass frequency characteristic that restricts transmission through it to the range of frequencies which it is assigned to accommodate, circuitry for maintaining the signal at the output of the branch at a constant strength, and circuitry for inhibiting transmission through the branch. Transmission through any of the narrowband branches is inhibited during intervals of time in which the narrowband signal that the branch is assigned to accommodate is not received at the repeater. Transmission through the broadband branch is inhibited during intervals of time in which one or more narrowband signals are received at the repeater. Thus, transmission of any signal through more than one branch is prevented and narrowband branches over which no signal is being transmitted contribute no noise to the composite signal relayed by the repeater. By virtue of the restrictive frequency characteristics of the parallel branches any intermodulation components generated as a result of the steps taken to maintain the narrowband component signals at a constant strength are suppressed and do not distort the composite signal relayed by the repeater.

The outputs of the branches are connected to a broadband power amplifier, having control circuitry to maintain its output at a constant signal strength. This amplifier boosts the strength of the signal for retransmission. Thus, regardless of whether the repeater is accommodating a single broadband signal or any number of the narrowband signals, the broadband power amplifier can be operated at maximum efficiency.

Figure 2A:
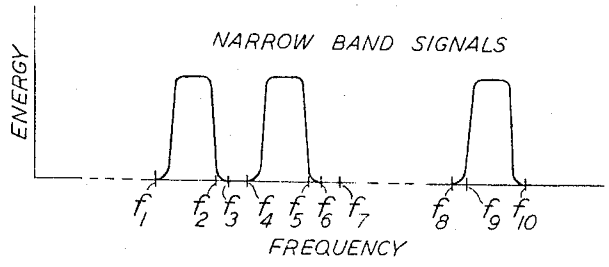
Figure 2B:
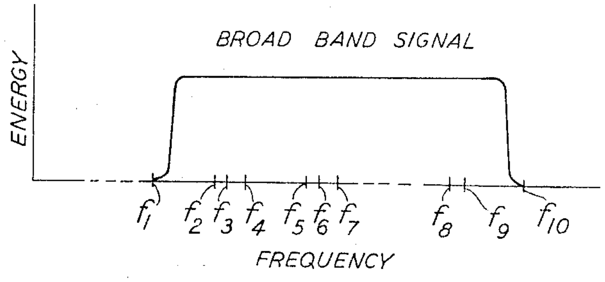

These and other features of the invention will become more apparent from consideration of the following detailed description taken in conjunction with the drawings in which:

FIG. 1 is a block diagram of a broadband radio repeater illustrating the invention; and FIGS. 2A and 2B are graphs illustrating the frequency spectrums of the signals which the repeater of FIG. 1 is designed to accommodate.

FIG. 2A represents the frequency spectrum of a plurality of narrowband signals occupying a frequency range $f_1$ through $f_{10}$. Three of these signals, occupying the frequency ranges $f_1$ through $f_3$, $f_4$ through $f_6$, and $f_8$ through $f_{10}$, respectively, are shown. They are separated by guard bands $f_3$ through $f_4$ and $f_6$ through $f_7$ in which no information is transmitted. A single broadband signal, occupying the same frequency range $f_1$ through $f_{10}$, is represented in FIG. 2B.

In FIG. 1 a repeater is shown which is designed to accommodate on an alternative basis either the narrowband signals illustrated in FIG. 2A or the broadband signal illustrated in FIG. 2B in a frequency modulated form. The narrowband signals may, when present, arrive at the repeater from different sources, thus having different signal strength and some or all of the narrowband signals may be received by the repeater, depending upon the traffic conditions of the system. An antenna 2 intercepts the composite radio-frequency signal transmitted to the repeater. This signal is coupled to a mixer 4 where it is beat with the output from a local oscillator 6 for the purpose of conversion to an intermediate frequency. The intermediate-frequency section of the repeater is composed of a group of narrowband branches shown within a dashed outline labeled 8 and a single broadband branch shown within a dashed outline labeled 10. The output from the intermediate frequency section is applied to a mixer 12 together with the output from a local oscillator 14 for conversion back to a radio frequency for transmission.

The branches comprising the intermediate frequency section are all connected in parallel between mixer 4 and mixer 12. There is one branch assigned to each narrowband signal. Each narrowband branch comprises an intermediate frequency amplifier 16, which has a bandpass frequency characteristic restricting transmission to the frequency range occupied by the narrowband signal to which it is assigned, a "break" contact 18, represented by a vertical line, a limiter 20, and a bandpass filter 22 restricting transmission to the frequency range occupied by the narrowband signal to which the branch is assigned. Whenever a narrowband signal is not received by the repeater, transmission through the branch which is assigned to it is inhibited. Non-reception of a narrowband signal is detected by squelch control circuitry 24 associated with the assigned branch, which then energizes a relay coil 26, associated with and opening contact 18 of that branch. Squelch control circuitry 24 could include a noise extracting bandpass filter restricting transmission to a small frequency range on the edge of the normal signal spectrum still within the frequency range transmitted by intermediate frequency amplifier 16 of that channel. In FIG. 2A, $f_2$ through $f_3$, $f_5$ through $f_6$, and $f_8$ through $f_9$ represent the frequency ranges which would be passed by such noise extracting filters associated with the branches assigned to accommodate narrowband signals $f_1$ through $f_3$, $f_4$ through $f_6$, and $f_8$ through $f_{10}$, respectively. A rectifier for producing a direct-current noise signal and an amplifier for preparing the noise signal for use would also be needed. As is well known, when a frequency modulation signal is being received, little noise energy appears due to the capture effect that takes place in a frequency modulation receiver, little energy passes through the noise filter, and coil 26 is not actuated. When no signal is being received, much noise energy appears and actuates coil 26.

The single broadband branch comprises an intermediate frequency amplifier 28, which has bandpass frequency characteristic restricting transmission to the entire frequency range $f_1$ through $f_{10}$, a "make" contact 30, represented by two crossed lines, a limiter 32 and a bandpass filter 34 permitting transmission in the entire frequency range $f_1$ through $f_{10}$. The outputs from squelch control circuits 24 of all the narrowband branches are applied to the input of a logical AND circuit 36. When squelch control circuits 24 of all of the narrowband branches indicate that no narrowband signal is being received by the repeater the output of AND circuit 36 energizes a relay coil 38, associated with and closing make contact 30, to permit transmission through the broadband branch. It can be seen from FIGS. 2A and 2B that the broadband signal, when received by the repeater, occupies the guard band frequency ranges of the narrowband signals. Thus, it actuates all of squelch control circuits 24 as if it were noise, and transmission through all the narrowband branches is inhibited. When the repeater is receiving any narrowband signal, on the other hand, its squelch control circuit 24 does not produce an output and transmission through the broadband branch is inhibited because contact 30 is open.

Thus, the disclosed transmission inhibiting control circuitry detects whether the repeater is at the time receiving the narrowband signals of broadband signal and, if the repeater is receiving the narrowband signals, this circuitry permits transmission through only the narrowband branches whose assigned signals are being received by the repeater. As a result, no noise from frequency bands in which no information is at the time being received is contributed to the composite signal applied to mixer 12 and simultaneous transmission of the same signal over one of the narrowband branches and the broadband branch is prevented.

Limiters 20 in the narrowband branches cause the narrowband signals combined at the outputs of the parallel branches to be equal in strength. Moreover, bandpass filters 22 prevent transmission of the intermodulation components generated by limiters 20 so as to be combined with the narrowband signals. Thus, the narrowband signals received by the repeater of weaker strength are not swamped by those of stronger strength.

If the repeater were to accommodate signals in amplitude modulated form, limiters 20 and 32 each could be replaced by a fast operating automatic gain control circuit and a codan, i.e., carrier operated device antinoise, circuit, could be substituted for each squelch control circuit 24. In this case, the presence of a carrier would actuate relay coil 26, contacts 18 would be make contacts, the outputs from all the codan circuits would be applied to a logical OR circuit that would drive relay coil 38, and contact 30 would be a "break" contact.

The frequency converted signal $f_2$ emanating from mixer 12 is amplified in a traveling wave tube 40 which, as is well known, is capable of broadband, high power amplification. A directional coupler 42 abstracts a sample of the output of traveling wave tube 40 and applies it to a detector 43. A direct-current signal proportional to the strength of the output of the traveling wave tube 40 results. This signal is employed by control circuitry represented by block 46 to control the gain of traveling wave tube 40. It could be, for example, circuitry that adjusts the cathode beam current of the traveling wave tube by varying the anode potential applied thereto. The gain control arrangement for traveling wave tube 40 is designed to be slow acting in order not to produce excessive intermodulation components.

By virtue of the gain control of traveling wave tube 40, the signal at its output, applied to an antenna 44 for transmission, is of constant strength regardless of whether a broadband signal or a plurality of narrowband signals are being accommodated by the repeater. In the latter case, a signal of constant strength is produced regardless of how many narrowband signals are being received by the repeater. Traveling wave tube is therefore utilized at maximum efficiency during all traffic conditions.

What is claimed is:

1. In a broadband repeater designed to accommodate on an alternative basis either a plurality of narrowhead signals or a single broadband signal occupying the same frequency range, a common input circuit, a common output circuit, and a plurality of branches connected in parallel between said input circuit and said circuit, one branch assigned to each narrowband signal and one branch assigned to the broadband signal, each of said branches having a bandpass characteristic restricting transmission therethrough to the frequency range occupied by the signal to which it is assigned and means inhibiting transmission therethrough, said inhibiting means of each of said narrowband branches being actuated when said repeater is not receiving the narrowband signal to which it is assigned, said inhibiting means of said broadband branch being actuated when said inhibiting means of any of said narrowband branches is unactuatetd.

2. In a broadband repeater capable of accommodating either a single broadband signal or a plurality of narrowband signals in the alternative, a plurality of branches connected in parallel with one another, one branch corresponding to each of said narrowband signals and one branch corresponding to said broadband signal, each of said branches having means for controlling transmission through it and a bandpass frequency characteristic restricting transmission through it to the frequency range occupied by the narrowband branch to which said branch corresponds, said transmission controlling means of each of said narrowband branches permitting transmission through said branch only during intervals in which said repeater is receiving the narrowband signal to which said branch corresponds, said transmission controlling means of said broadband branch permitting transmission through said branch only during intervals in which the transmission controlling means of each of said narrowband branches is not permitting transmission.

3. In a broadband repeater designed to accommodate on an alternative basis in the same frequency range either a single broadband signal or a plurality of narrowband signals some of which may at times not be received by said repeater, an input circuit, an output circuit, a plurality of branches connected in parallel between said input circuit and said output circuit, one branch assigned to each narrowband signal and one branch assigned to the broadband signal, each of said branches having a bandpass frequency characteristic restricting transmission therethrough to the frequency range occupied by the signal to which it is assigned and means within each assigned narrowband branch of preventing transmission through its respective branch when the narrowband signal assigned to that branch is not being received and when the broadband signal is received.

4. In a broadband repeater having the apparatus recited in claim 3, means for preventing transmission through said branch assigned to the broadband signal during reception of any narrowband signal by said repeater.

5. In a broadband repeater designed to accommodate on an alternative basis either a plurality of narrowband signals or a single broadband signal occupying the same frequency range, a common input circuit, a common output circuit, and a plurality of branches connected in parallel between said input circuit and said output circuit, one branch assigned to each narrowband signal and one branch assigned to the broadband signal, each of said branches having means for maintaining signal of constant strength at the output thereof, a bandpass characteristic restricting transmission therethrough to the frequency range occupied by the signal to which it is assigned, and means inhibiting transmission therethrough, said inhibiting means of each of said narrowband branches being actuated when said repeater is not receiving the narrowband signal to which it is assigned, said inhibiting means of said broadband branch being actuated when said inhibiting means of any of said narrowband branches is unactuated.

6. In a broadband repeater accommodating in the alternative a plurality of narrowband signals or a single broadband signal occupying the same frequency range, an input circuit to which is applied the signal to be accommodated, a broadband amplifier whose output power is maintained constant, and a plurality of branches connected in parallel between said input circuit and said broadband amplifier, one branch accommodating each narrowband signal and one branch accommodating the broadband signal, each of said branches having means for limiting the signal transmitted therethrough and means for inhibiting transmission through said branch, said inhibiting means of said narrowband branches being actuated whenever no signal is transmitted therethrough, said inhibiting means of said broadband branch being actuated whenever said inhibiting means of any of said narrowband branches is unactuated.

7. A broadband radio repeater comprising a broadband power amplifier, a plurality of branches the output of each of which is connected to the input of said amplifier, each of said branches having a bandpass frequency characteristic restricting transmission therethrough to a different frequency range, means for applying each portion of the signal received by said repeater to the branches the bandpass characteristic of which corresponds to the frequency range occupied by said portion, means within each branch for inhibiting transmission through that branch when no signal is received in the frequency range corresponding to that branch, and means for equalizing the strength of the signals at the outputs of said branches.

8. A broadband radio repeater comprising an input circuit, a broadband power amplifier and a plurality of branches connected in parallel between said input circuit and said amplifier, each branch having a bandpass frequency characteristic restricting transmission therethrough to a different frequency range, control means for connecting and disconnecting the signal path through said branch, each of said control means connecting the signal path of its corresponding branch only during intervals of time in which a signal is being transmitted in the bandpass frequency range within which said branch transmits.

9. In a broadband radio repeater accommodating a plurality of narrowband signals only some of which are at times received by the repeater, a broadband power amplifier, means for controlling the power level at the output of said amplifier an input circuit, and a plurality of branches connected in parallel between said input circuit and said amplifier, one branch assigned to each narrowband signal, each branch having in the order recited means for inhibiting transmission through the branch, a limiter, and a bandpass filter restricting transmission through the branch to the frequency range occupied by the narrowband signal assigned to the branch, said inhibiting means of each branch being activated during intervals in which the narrowband signal assigned to the branch is not being received by the repeater.

References Cited by the Examiner

UNITED STATES PATENTS

| | | | |
|---|---|---|---|
| 2,000,130 | 5/1935 | Espenschied et al. | 325–3 |
| 2,478,409 | 8/1949 | Loughlin | 325—3 X |
| 3,028,489 | 4/1962 | Chasek | 325—3 |

DAVID G. REDINBAUGH, *Primary Examiner.*

J. W. CALDWELL, *Assistant Examiner.*